Dec. 30, 1930.   W. H. JONES   1,787,276
PRINTED FOLDER
Filed June 14, 1928

Walter H. Jones
INVENTOR
BY Williams, Rich & Morses
ATTORNEYS

Patented Dec. 30, 1930

1,787,276

UNITED STATES PATENT OFFICE

WALTER H. JONES, OF HASBROUCK HEIGHTS, NEW JERSEY

PRINTED FOLDER

Application filed June 14, 1928. Serial No. 285,316.

This invention relates to printed folders adapted to be used in various fields, for example, by steamship companies for vividly illustrating to prospective passengers the general layout of a particular ship or particular ships insofar as stateroom arrangements, deck plans, living quarters and other features are concerned.

The general object of the invention is to provide a simple folder of the character mentioned, in which various parts thereof are so arranged with respect to each other that related printed matter may be readily considered.

A further object of the invention is to provide a folder of the character mentioned which may be so folded as to occupy as little space as possible, which is so constructed as to require a minimum amount of paper, and which is so designed as to enable it to be cheaply produced.

Figure 1:
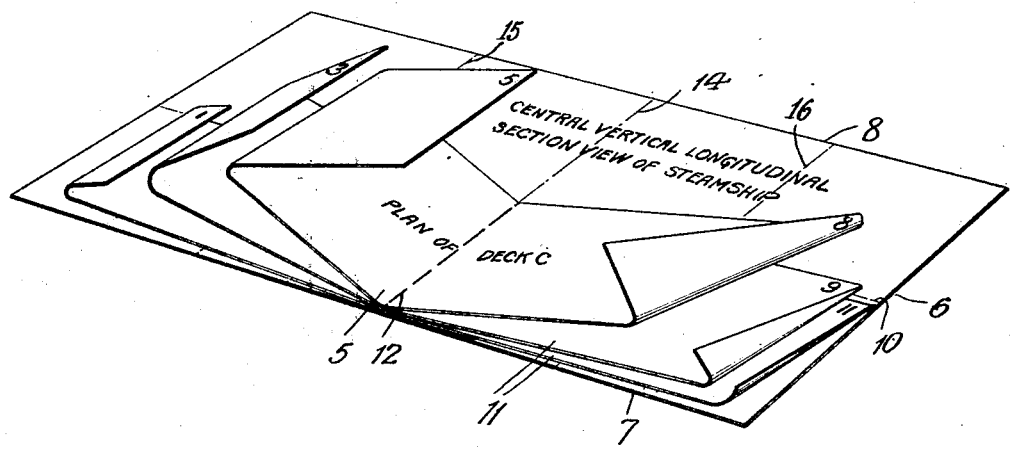
Figure 2:
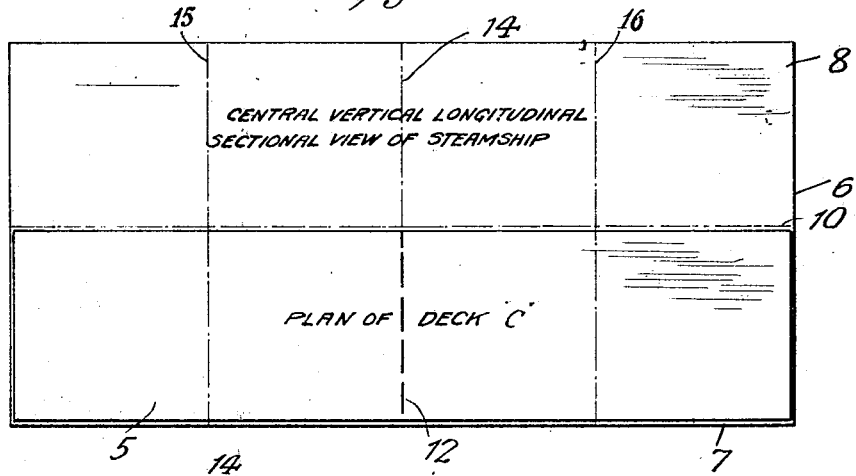
Figure 3:
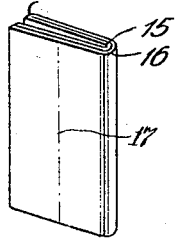

Other objects and advantages of the invention will become apparent from the following description, taken in connection with the accompanying drawings in which:

Figure 1 is a perspective view of the folder when opened; Figure 2 is a plan view of the folder; and Figure 3 is a perspective view of the device, folded into compact form.

The folder herein shown includes two major parts, namely, a booklet 5 and a cover sheet 6. The cover sheet 6 is divided into two sections 7 and 8 along a definite line of fold 10, the section 7 serving as a back for the booklet 5 and the section 8 serving as an extension upon the top face of which, as viewed in Figures 1 and 2, may be carried suitable indicia, such as a vertical longitudinal sectional view of a steamship, which, when the section 8 is extended as shown in Figures 1 and 2, appears directly above the top of the booklet 5.

The booklet 5 is made up of a plurality of sheets 11, herein shown as three in number, the area of each sheet being substantially equal to the area of the sections 7 and 8, respectively. The sheets 11 are secured intermediate their ends to each other and to the section 7 by any suitable means such as wire stitching 12, thus providing a plurality of leaves having their pages consecutively numbered from 1 to 12 inclusive.

Assuming, for example, that a particular vessel, shown in section on the top face of the section 8 as viewed in Figures 1 and 2, has five decks identified as decks A, B, C, D and E, the pages 2 and 3, 4 and 5, 6 and 7, 8 and 9, 10 and 11, may be provided with plan views of these decks respectively. In the case of pages 6 and 7, the plan view of deck C may be an unbroken view extending from one page to the other, but in the case of the remaining adjacent pages, a portion of a given deck may be printed on one page and the remaining portion of that deck printed on the adjacent page, so that when the sheets 11 are fastened together in a superimposed relation the composite parts of the plan view will be properly joined to present the entire view without showing any appreciable line of demarcation. As to pages 1 and 12 and the adjacent faces of the section 7, these pages and faces may be provided with such data or indicia as may be desired, not necessarily having the direct relation to the subject matter appearing on the top side of the section 8, as viewed in Figures 1 and 2, that exists between such subject matter and the subject matter appearing on pages 2 and 3, 4 and 5, 6 and 7, 8 and 9, 10 and 11 of the booklet 5 above described. Of course, other arrangements of printed matter may be used, and the one suggested above is merely illustrative.

In order to fold the device into relatively compact form, as shown in Figure 3, the section 8 is first folded on the line 10 over upon pages 7 and 8 of the booklet 5, so that the booklet is then confined between the sections 7 and 8 with the leaves of each half thereof in an extended and superimposed relation. After folding the section 8 over upon the booklet 5 along the line of fold 10, the structure is then folded centrally along the line of stitching 12 and the line of fold 14, as shown in Figure 3, whereupon the structure thus far folded is folded again on the lines of fold 15 and 16 shown in Figures 2 and 3. If desired, the folder may be still further reduced in size by folding along the line 17 shown in Figure 3.

Having thus described the invention what is claimed is:

A printed folder comprising a booklet including a plurality of flexible booklet sheets arranged in a face-to-face relation and connected to each other along a transverse medial line and having leaf portions at opposite sides of said medial line serving as leaves of the booklet, said leaf portions being creased along definite lines parallel to said medial line; and a flexible cover sheet secured to said booklet sheets along the line of union thereof and forming in part a complete cover for the booklet, said cover being creased along definite lines in correspondence with said definite lines of said leaf portions and extending in the direction of said transverse medial line for a substantial distance beyond a margin of the leaf portions of the booklet when said booklet is in an open position so as to provide space for exhibiting material comparable with material to be provided on respective pages of said booklet, said extending part being undivided in alignment with said transverse medial line and presenting an unbroken surface, said extending part being creased along definite parallel lines located correspondingly to the first-mentioned definite lines and adapted to fold over as a whole upon the open pages of said booklet; and said cover, booklet and extending part being adapted, when said extending part is folded over upon said booklet, to be folded simultaneously along their respective said definite lines into a compact unit with said extending part closed within the booklet of such unit.

In testimony whereof, I have affixed my signature to this specification.

WALTER H. JONES.